Dec. 10, 1963        R. MAESTRELLI        3,113,529
GUIDE AND SWITCH RAIL SYSTEM FOR VEHICLES
Filed Nov. 28, 1961                3 Sheets-Sheet 1
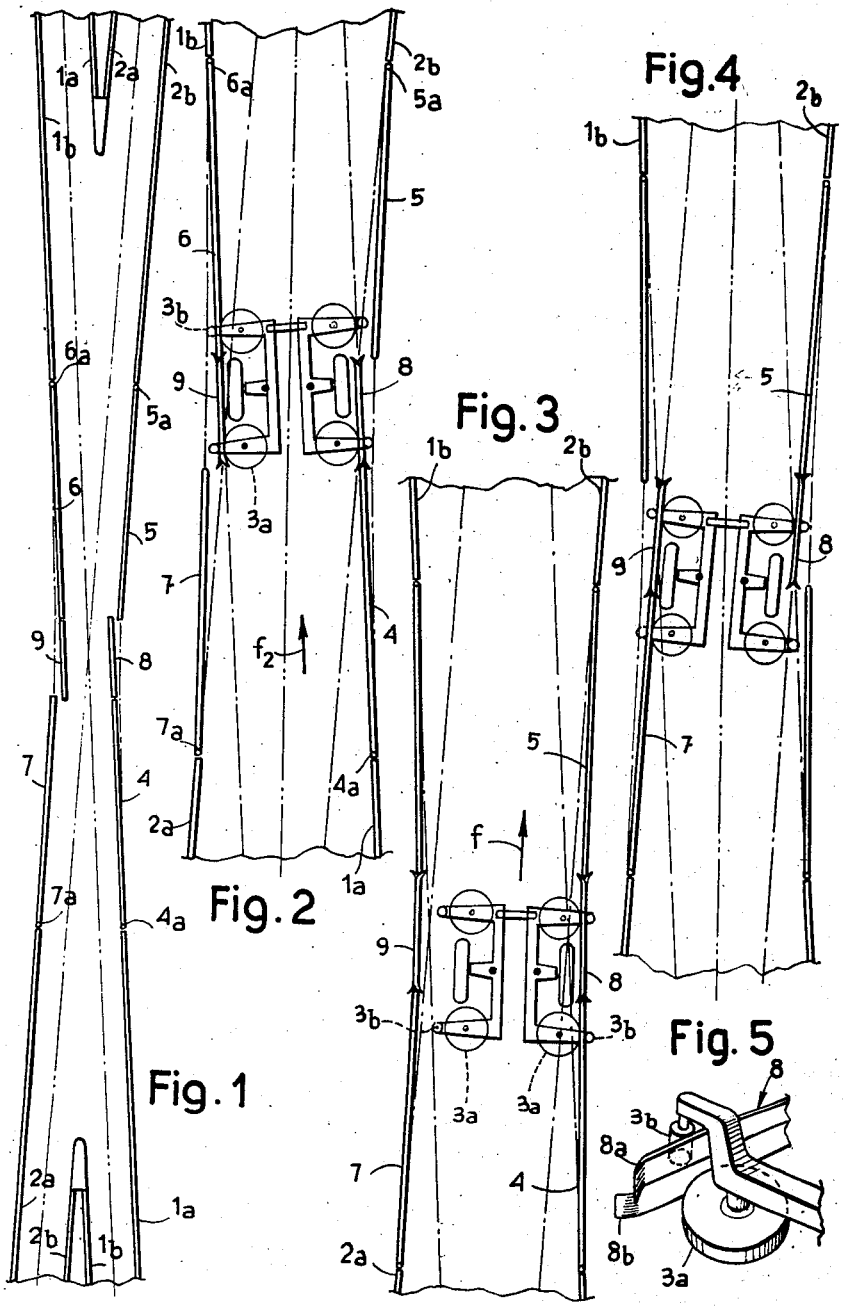
INVENTOR:
RAFFAELLO MAESTRELLI Dec. 10, 1963  R. MAESTRELLI  3,113,529
GUIDE AND SWITCH RAIL SYSTEM FOR VEHICLES
Filed Nov. 28, 1961  3 Sheets-Sheet 2
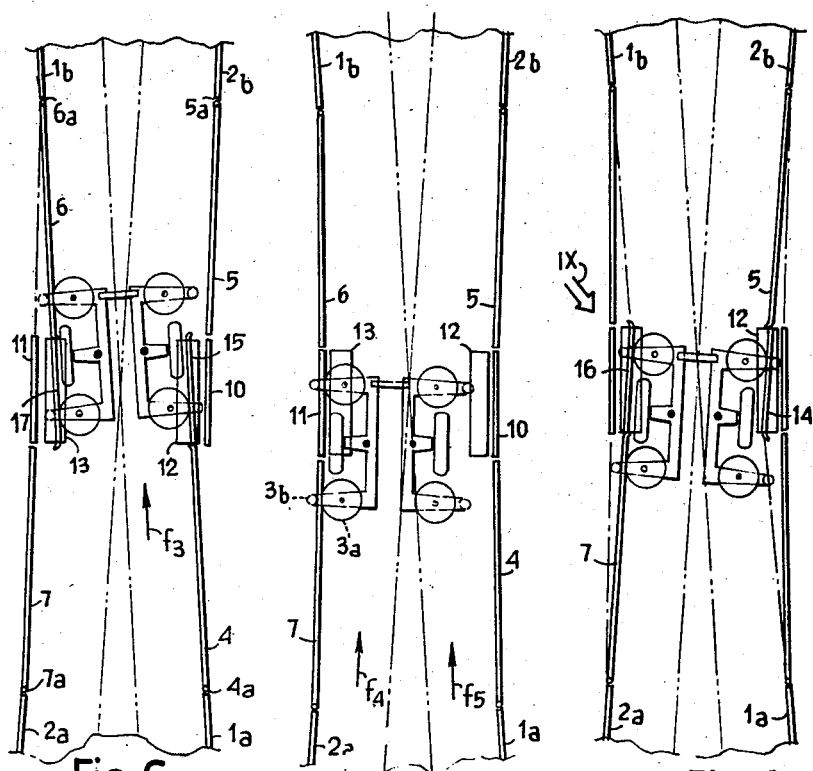
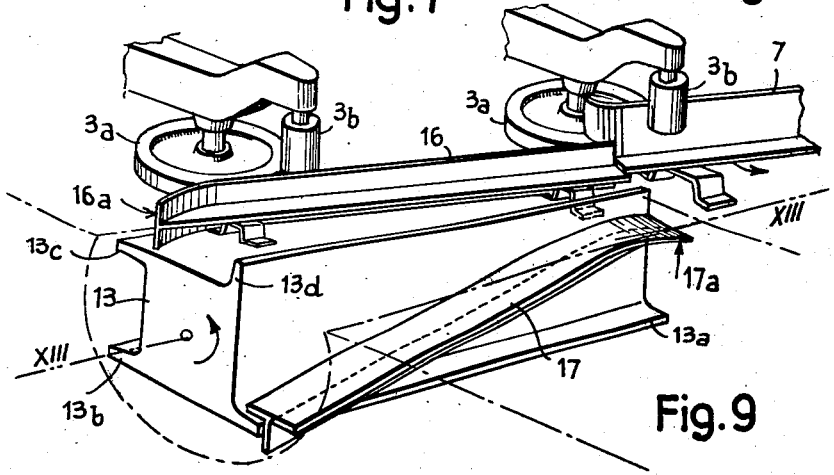
INVENTOR:
RAFFAELLO MAESTRELLI Dec. 10, 1963  R. MAESTRELLI  3,113,529
GUIDE AND SWITCH RAIL SYSTEM FOR VEHICLES
Filed Nov. 28, 1961  3 Sheets-Sheet 3
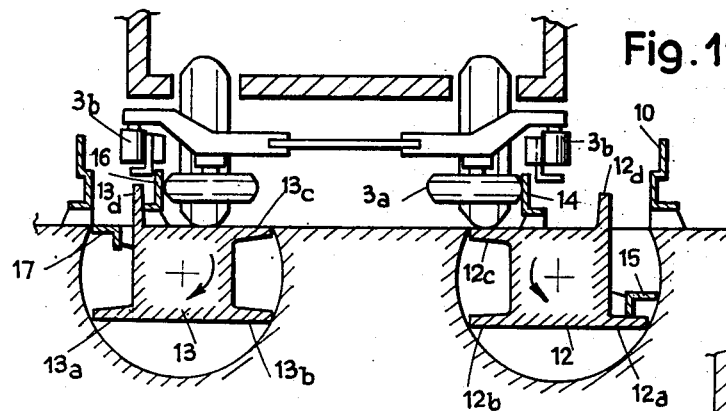
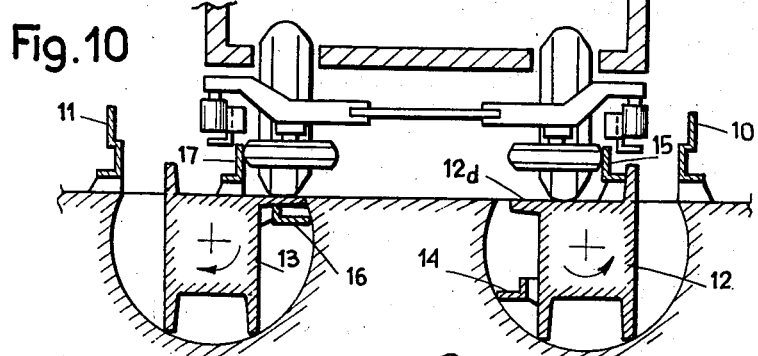
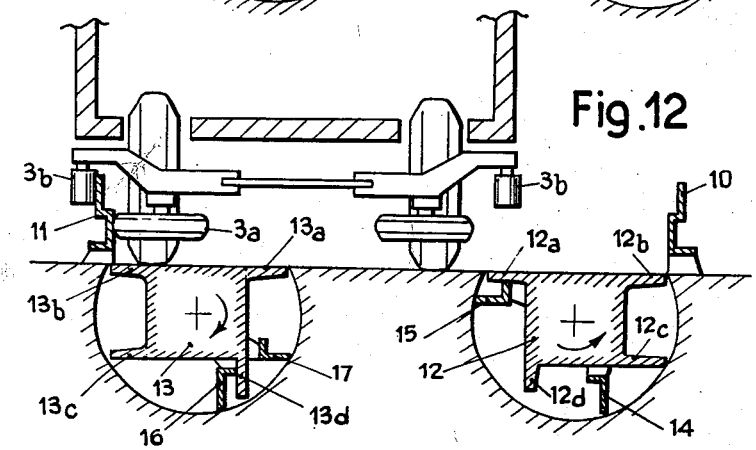
INVENTOR:
RAFFAELLO MAESTRELLI

United States Patent Office 3,113,529
Patented Dec. 10, 1963

3,113,529
GUIDE AND SWITCH RAIL SYSTEM
FOR VEHICLES
Raffaello Maestrelli, Via Carnaghi 2, Milan, Italy
Filed Nov. 28, 1961, Ser. No. 155,363
Claims priority, application Italy Dec. 1, 1960
6 Claims. (Cl. 104—247)

The present invention relates to a guide rail system for vehicles. The invention is particularly applicable to vehicles having main wheels or tires rotating on a roadbed in vertical planes on horizontal axes, and guide wheels or rollers rotating in horizontal planes on vertical axes in contact with rails disposed in vertical planes.

One object of the invention is to provide a novel arrangement of switch rails and guide rails at an intersection of two tracks so that a vehicle can be guided from one section of either track to another section of the same track, or from one section of either track to another section of the other track.

Another object is to provide a guide rail arrangement in which one portion of a guide rail is contacted on one side of the rail by guide wheels while another portion of the rail is contacted on the other side of the rail by guide rollers.

A further object is to provide a switch and guide rail system in which curved portions of the system are defined by pivotable switch rails with pivotable guide rails disposed therebetween.

Another object is to provide a switch and guide rail system with axially rotatable guide blocks carrying guide rails on certain sides thereof for guiding guide wheels of a vehicle, and with adjacent stationary guide rails for both guide wheels and guide rollers on opposite sides of the stationary guide rails.

The invention will be best understood from the following detailed description taken together with the drawing, wherein:

FIGS. 1–4 are plan views partially diagrammatic in form of a guide and switch rail system, with guide and switch rails shown in different positions.

FIG. 5 is a fragmentary perspective view of a part of a guide rail and associated guide wheel of a vehicle.

FIGS. 6–8 are plan views partially diagrammatic in form of another guide rail system with guide and switch rails shown in different positions.

FIG. 9 is a perspective view of a guide block carrying guide rails, shown in association with a portion of a switch rail and guide wheels of a vehicle.

FIGS. 10–12 are cross-sectional views on an enlarged scale of the systems of FIGS. 6, 8 and 7 respectively.

Referring to the drawing:

FIG. 1 shows a first track comprising two parallel rails 1a, 1b and a second track comprising two parallel rails 2a, 2b. The two tracks intersect as clearly shown in FIG. 1. The rails are disposed in vertical planes and their inner sides are contacted by guide wheels 3a of a vehicle. The wheels 3a rotate on vertical axes. The vehicle has guide rollers 3b offset horizontally from wheels 3a and rotatable on vertical axes as indicated in FIGS. 2–5. The rollers 3b contact outer sides of guide rails forming parts of rail switches at the intersection of the tracks.

Switch rail 4 is pivotable at pivot point 4a with respect to rail 1a. Switch rail 5 is pivotable at pivot point 5a with respect to rail 2b. Switch rail 6 is pivotable at pivot point 6a with respect to rail 1b. Switch rail 7 is pivotable at pivot point 7a with respect to rail 2a. Pivot points 4a and 7a are aligned with each other in a direction across the tracks. Pivot points 5a and 6a are also aligned with each other in a direction across the tracks. Thus, the free ends of switch rails 5, 6 which are of equal length are thus aligned with each other in a direction across the tracks; and the free ends of switch rails 4, 7 which are of equal length are aligned in a direction across the tracks. Each of the switch rails 3—7 may be aligned with the rail to which it is pivotally joined as shown in FIG. 1 or may be pivoted at an angle thereto as shown in FIGS. 2 and 4. The switch rails 4—7 have lower portions which are contacted by wheels 3a and upper portions which are contacted by rollers 3b.

Between switch rails 4 and 5 is a short intermediate guide rail 8 and between rails 6, 7 is a short intermediate guide rail 9. Guide rails 8 and 9 have upper portions which are contacted by rollers 3b and lower portions which are contacted by wheels 3a. The short intermediate guide rail 8 has inwardly curved opposite ends 8a on their upper portions and outwardly curved opposite ends 8b on their lower portions (see FIG. 5). Guide rail 9 has corresponding upper inwardly curved end portions and lower outwardly curved end portions. These curved end portions of rails 8, 9 facilitate passage of the wheels 3a, 3b on and off the lower portions of rails 8, 9 and facilitate passage of rollers 3a, 3b on and off the upper portions of rails 8, 9. The rails 8, 9 may be turned in a horizontal plane by suitable levers (not shown).

FIGS. 1 and 2 show the guide rails 8, 9 aligned with switch rails 4 and 6, respectively, so that a vehicle moving along the rails in direction $f_2$ will be constrained to move along rails 1a, 1b aligned with rails 4 and 6 respectively. FIG. 4 shows guide rails 8, 9 respectively aligned with switch rails 5 and 7 which in turn are aligned with rails 2a and 2b so that the vehicle will be constrained to move along rails 2a, 2b. FIG. 3 shows rail 8 located at the center of a curved section of track including switch rails 4, 5 turned slightly at opposite angles to track rails 1a and 2b respectively; and rail 9 is located at the center of a curve including switch rails 6 and 7 turned slightly at opposite angles to track rails 1b, 2a respectively. Thus, a vehicle moving in direction $f$ will pass from rails 1a, 1b to rails 2a, 2b. The vehicle is guided along the inner portion of the curve by engagement of rollers 3b with upper portions of rails 4, 8 and 5 in turn while the opposite rollers 3b are out of contact with rails 7, 9 and 6.

When a vehicle is travelling in direction $f_2$ in the rail arrangement of FIG. 2, the vehicle is guided initially by track rail 1a, then by switch rail 4, then by guide rails 8, 9, then by switch rail 6, and finally by track rails 1a, 1b.

If a permanent one-way switching rail system is to be provided for switching from track 1a, 1b to track 2a, 2b as is done in FIG. 3, then rail 9 is not required. For the switching arrangement of FIG. 4 it is possible to omit either one of the guide rails 8, 9 since the remaining rail will engage the rollers 3b of the vehicle to effect proper switching.

In the rail system of FIGS. 6–12, the switch rails 4—7 and track rails 1a—2b are the same as in FIGS. 1–4. Movable guide rails 8 and 9 have been replaced by stationary guide rails 10, 11. The switch rails 4 and 5 form parts of a curve with guide rail 10 while switch rails 6 and 7 form parts of a curve with guide rail 11 when the switch rails are turned to the position of FIG. 7. Then a vehicle moving in direction $f_5$ on track 1a, 1b will be switched to track 2a, 2b and a vehicle moving in direction $f_4$ on track 2a, 2b will be switched to track 1a, 1b.

In order to provide for travel of the vehicle from one section of track 1a, 1b to the other section of track 1a, 1b and from one section of track 2a, 2b to the other section of track 2a, 2b without cross switching, there are provided novel rotatable guide blocks 12, 13 adjacent to the guide rails 10, 11 respectively. Each of the guide blocks is rotatable on its longitudinal axis XIII (see FIGS. 9–12). The blocks are rotatable in cavities in the ground. Block 12 has two flat parallel, coplanar flanges 12a, 12b at one side. Third and fourth flanges 12c, 12d are longitudinally parallel to flanges 12a, 12b at the opposite side of the block. Fourth flange 12d extends outwardly of the block in a plane perpendicular to the planes of flanges 12a—12c. A guide rail 14 extends diagonally on the side of the block 12 having flanges 12c, 12d. A further guide rail 15 extends diagonally along the same side of the block having flanges 12a, 12d.

Block 13 is constructed like block 12 with two parallel coplanar flanges 13a, 13b on one side, and two flanges 13c, 13d on another opposite side of the block. The flanges are all longitudinally parallel to each other with flanges 13a, 13b, 13c extending in two spaced parallel planes and the plane of flange 13d extending perpendicularly to the planes of flanges 13a, 13b, 13c. Rail 16 extends diagonally along the side of the block having flanges 13c, 13d. Rail 17 extends diagonally along the side of the block having flanges 13a, 13d.

Guide rails 14—17 are arranged so that they are only contacted by guide wheels 3a of the vehicle. Switch rails 4—7 are contacted only by guide rollers 3b. Guide rails 10, 11 can be contacted at inner sides of their lower portions by guide wheels 3a and at outer sides of their upper portions by guide rollers 3b. The track rails 1a, 1b and 2a, 2b are contacted only by the guide wheels 3a. The main wheels or tires of the vehicle roll in vertical planes on horizontal axes.

FIGS. 6 and 10 show the blocks 12 and 13 held so that guide rails 15 and 17 are disposed on the tops of the blocks. In this position rail 15 is aligned with switch rail 4 while rail 17 is aligned with switch rail 6. When a vehicle travels in direction $f_3$ it will pass from one section of track 1a, 1b to the other section of track 1a, 1b. In doing so, inner guide wheels 3a and outer guide rollers 3b will contact, in turn, track rail 1a and switch rail 4. Only wheels 3a will contact guide rail 15 on the right side and guide rail 17 on the left side; and then wheels 3a and rollers 3b will contact switch rail 6 and track rails 1a, 1b. The main wheels or tires of the vehicle ride on flange 13d which is horizontal and on the upper side of the block 12.

FIGS. 8 and 11 show the guide blocks 12, 13 rotated so that rails 14 and 16 are on the upper sides of the rails. Rail 14 is aligned with switch rail 5, while rail 16 is aligned with switch rail 7. The main wheels or tires will ride on the upper side of block 13 and on flange 12c. Rails 14, 16 will constrain only the guide wheels 3a as the vehicle passes over the blocks.

The vehicle will move along the rail system from one section of track 2a, 2b to the other section of track 2a, 2b. The guide wheels 3a and rollers 3b will contact track rails 2a, 2b then switch rail 7. Only wheels 3a will then contact rails 14, 16. The guide wheels 3a and rollers 3b will contact switch rail 5 and thereafter track rails 2a, 2b.

In FIGS. 7 and 12, the blocks 12, 13 are shown rotated to the positions where flanges 12a, 12b and 13a, 13b are uppermost. The rails 14—17 are concealed. The tires of the vehicle then roll over upper side of block 13 and on the roadbed between the blocks. Switching is effected from track 1a, 1b to track 2a, 2b when the vehicle travels in path or direction $f_5$ and switching is effected from track 2a, 2b to track 1a, 1b when the vehicle travels in path or direction $f_4$. In travelling path $f_4$, the left guide wheels 3a and guide rollers 3b contact guide rail 11 and in travelling path $f_5$, right guide wheels 3a and guide rollers 3b contact guide rail 10.

Leading ends of rails 14, 17 and trailing ends of rails 15, 16 may be curved outwardly as indicated at 16a and 17a as shown in FIG. 9, to facilitate entrance of the guide wheels 3a thereon. Ends of switch rails 5 and 7 adjacent to rails 14 and 16 can be curved as shown in FIG. 8 and ends of switch rails 4, 6 adjacent to rails 15 and 17 can be curved to facilitate passage of rollers 3b.

While I have shown and described what I believe to be the best embodiments of my invention, it will be apparent to those skilled in the art that various changes and modifications may be made therein without departing from the spirit and scope of the invention as defined in the appended claims.

What I claim is:

1. A guide and switch rail system for a vehicle at a track intersection on a roadbed wherein said vehicle has inner guide wheels and outer guide rollers, comprising:
    (a) a first pair of converging track sections of two tracks;
    (b) a second pair of converging track sections of the two tracks;
    (c) each track section having a pair of horizontally spaced track rails engageable by the inner guide wheels of the vehicle;
    (d) four switch rails each pivotally mounted at one end thereof adjacent to one end of one track rail, each of the switch rails being engageable on an inner side portion by the inner guide wheels of the vehicle and being engageable on an outer side portion by the outer guide rollers of the vehicle; and
    (e) a pair of movable guide rails, each guide rail being engageable on an inner lower side portion thereof by the inner guide wheels and being engageable on an outer upper side portion thereof by the outer guide rollers, said guide rails each having opposite ends located near free ends of two of the switch rails; said switch and guide rails being movable into various positions with respect to each other, said switch rails being respectively alignable with the track rails and being angularly pivotable with respect to the track rails, one of the guide rails being alignable with any one of two switch rails while the other guide rail is aligned with any one of the other two switch rails, said guide rails being further disposable so that opposite ends of each guide rail terminate at adjacent ends of two of the switch rails.

2. A guide and switch rail system according to claim 1, wherein opposite ends of the lower side portions of the guide rails are turned outwardly while opposite ends of the upper side portions of the guide rails are turned inwardly to facilitate passage of the guide wheels and guide rollers on and off the guide rails.

3. A guide and switch rail system for a vehicle at a track intersection on a roadbed wherein said vehicle has inner guide wheels and outer guide rollers, comprising:
    (a) a first pair of converging track sections of two tracks;
    (b) a second pair of converging track sections of the two tracks;
    (c) each track section having a pair of horizontally spaced track rails engageable by the inner guide wheels of the vehicle;
    (d) four switch rails each pivotally mounted at one end thereof adjacent to one end of one track rail, each of the switch rails being engageable on an inner side portion by the inner guide wheels of the vehicle and being engageable on an outer side portion by the outer guide rollers of the vehicle; and
    (e) a pair of stationary guide rails, each guide rail being on an inner lower side portion thereof by the inner guide wheels and being engageable on an outer upper side portion thereof by the outer guide rollers, said guide rails each having opposite ends located near free ends of two of the switch rails, said switch rails being movable into various positions in alignment with and angularly spaced from the guide rails, whereby the vehicle may move from one section of one track to one section of the other track when the switch rails are aligned with the guide rails.

4. A guide and switch rail system for a vehicle at a track intersection on a roadbed wherein said vehicle has inner guide wheels and outer guide rollers, comprising:

(a) a first pair of converging track sections of two tracks;

(b) a second pair of converging track sections of two tracks;

(c) each track section having a pair of horizontally spaced track rails engageable by the inner guide wheels of the vehicle;

(d) four switch rails each pivotally mounted at one end thereof adjacent to one end of one track rail, each of the switch rails being engageable on an inner side portion by the inner guide wheels of the vehicle and being engageable on an outer side portion by the outer guide rollers of the vehicles;

(e) a pair of stationary guide rails, each guide rail being engageable on an inner lower side portion thereof by the inner guide wheels and being engageable on an outer upper side portion thereof by the outer guide rollers, said guide rails each having opposite ends located near free ends of two of the switch rails, said switch rails being movable into various positions in alignment with and angularly spaced to the guide rails, whereby the vehicle may move from one section of one track to one section of the other track when the switch rails are aligned with the guide rails;

(f) a pair of elongated axially rotatable horizontally extending guide blocks, said blocks being disposed in cavities in the roadbed adjacent to the guide rails, said blocks each having four mutually perpendicular flat sides;

(g) a longitudinally extending flange at each edge of each side of each block;

(h) a guide rail member disposed diagonally on one side of each block; and (i) another guide rail member disposed diagonally on another side of each block adjacent to said one side of the block, said guide rail members being engageable only by the inner guide wheels of the vehicle when any of the guide rail members are exposed outside of the cavities, said switch rails being selectively alignable with the exposed guide rail members, whereby the vehicle may move from one section of either track to another section of the same track when the switch rails are aligned with the exposed guide rail members.

5. A guide and switch rail system according to claim 4, wherein one end of each guide rail member is curved to facilitate passage of the guide wheels on and off the guide rail members.

6. A guide and switch rail system according to claim 5, wherein ends of certain switch rails are curved to facilitate passage of guide rollers on and off the switch rails.

References Cited in the file of this patent

UNITED STATES PATENTS

| | | |
|---|---|---|
| 1,612,374 | Harris | Dec. 28, 1926 |
| 1,660,715 | Lingenfelder | Feb. 28, 1928 |
| 2,101,024 | Heinze | Dec. 7, 1937 |
| 2,161,314 | Randall et al. | June 6, 1939 |